United States Patent

Landler et al.

[11] Patent Number: 5,826,993
[45] Date of Patent: Oct. 27, 1998

[54] APPARATUS HAVING A ROLLER FOR DRIVING A RECORD CARRIER AND HAVING A PRINTING DEVICE, WHICH ARE MOVABLE RELATIVE TO ONE ANOTHER

[75] Inventors: Martin Landler, Bad Vöslau; Johann Veigl, Vienna, both of Austria

[73] Assignee: U.S. Philips Corporation, New York, N.Y.

[21] Appl. No.: 896,758

[22] Filed: Jul. 18, 1997

[30] Foreign Application Priority Data

Jul. 22, 1996 [EP] European Pat. Off. ............. 96890128

[51] Int. Cl.$^6$ ............................................. B41J 19/76
[52] U.S. Cl. ........................................ 400/569; 400/185
[58] Field of Search ................................. 400/185, 317.3, 400/320, 555, 569, 637.1, 629, 659, 648, 55, 59; 271/10.11, 116

[56] References Cited

U.S. PATENT DOCUMENTS 5,451,991  9/1995  Saito et al. ............................... 400/662

OTHER PUBLICATIONS

Facsimile apparatus of Samsung: Home Fax SF–30.

*Primary Examiner*—Ren Yan
*Attorney, Agent, or Firm*—Robert J. Kraus

[57] ABSTRACT

In an apparatus (1) having a roller (14) for driving a record carrier (5), and having a motor (21) which is switchable between a first direction of rotation (22) and a second direction of rotation (23), by means of which in its first direction of rotation (22) the roller (14) is drivable to drive a record carrier (5), and having a printing device (32) which extends parallel to the roller (14), at least one shaft section (16, 17) connected to the roller (14) forms part of drive means (47, 48) for driving at least one actuating device (45, 46) for moving the printing device (32) away from the roller (14), the drive means (47, 48) further comprising a unidirectional coupling (49, 50) arranged adjacent the actuating device (45, 46) and drivable via the shaft section (16, 17), which coupling forms a drive transmission between the shaft section (16, 17) ) and the actuating device (45, 46) in the second direction of rotation (23) of the motor (21).

10 Claims, 6 Drawing Sheets

APPARATUS HAVING A ROLLER FOR DRIVING A RECORD CARRIER AND HAVING A PRINTING DEVICE, WHICH ARE MOVABLE RELATIVE TO ONE ANOTHER

BACKGROUND OF THE INVENTION

Apparatus having a roller for driving a record carrier and having a printing device, which are movable relative to one another.

The invention relates to an apparatus comprising a roller for driving a record carrier, which roller is rotatable about a roller axis and is connected to at least one shaft section, and a motor which can be operated in a first direction of rotation and in a second direction of rotation, which is opposite thereto, and which when operated in the first direction of rotation can drive the roller for driving a record carrier, and a printing device which extends substantially parallel to the roller and which has a contact surface held in engagement with the circumferential surface of the roller in one operating mode of the apparatus and spaced from the circumferential surface of the roller by a given distance in another operating mode of the apparatus, and at least one actuating device which is rotatably mounted on the shaft section connected to the roller and by means of which the printing device and the roller are movable relative to one another in a direction transversely to the roller axis, and drive means for driving the actuating device, which drive means can be driven by the motor and by means of which the printing device and the actuating device is drivable when the motor operates in the second direction of rotation, in order to move the printing device and the roller relative to one another.

An apparatus of the type defined in the opening paragraph is commercially available under the type designation SF30 TG and is consequently known. In the known apparatus the additional drive means comprise a first toothed wheel, which can be driven by a toothed wheel of a motor-driven roller drive mechanism and which is automatically pivotable depending on the direction of rotation of the motor, a second toothed wheel, which is rotationally locked to a synchronization shaft and with which the first toothed wheel is brought into mesh in the second direction of rotation of the motor, i.e. when the motor is driven in the second direction of rotation, two intermediate toothed wheels, which are rotationally locked to the synchronization shaft and which mesh with two actuating toothed wheels which are each rotatably mounted on one of two shaft sections of a shaft of the roller and which are integrally connected to one of two actuating devices formed by actuating discs which are each rotatably mounted on one of two shaft sections of the roller shaft and which each have an actuating projection. Owing to the automatically pivotable first toothed wheel it is not possible to achieve a satisfactory reliability because under unfavorable friction conditions the situation can arise that the first toothed wheel is not pivoted. The provision of the synchronization shaft is also unfavorable because it requires additional space, which is moreover situated at a location in the apparatus which is critical for the transport of the record carrier driven by means of the roller. Another problem is that the additional drive means comprise a comparatively large number of parts, which is unfavorable in view of a simple, cheap and reliable construction. Finally, a further problem is that during production of the apparatus when the two actuating discs are mounted the two actuating discs with their actuating projections should be mounted in precisely identical angular positions on the two shaft sections of the roller shaft in order to achieve a synchronous and, consequently, trouble-free actuation function with the two actuating discs, which is a cost-raising factor, resulting in a more expensive production of the apparatus.

SUMMARY OF THE INVENTION

It is an object of the invention to preclude the aforementioned problems and to provide an improved apparatus of the type defined in the opening paragraph, by means of which a high reliability as regards the realization of a relative movement between the printing device and the roller by means of at least one actuating device which is drivable by the additional drive means is assured and by means of which a simple, cheap and reliable construction is achieved. According to the invention, in order to achieve this object with an apparatus of the type defined in the opening paragraph, the at least one shaft section connected to the roller forms a part of the drive means, and the drive means further comprise a unidirectional coupling arranged adjacent the actuating device and drivable via the shaft section, which coupling forms a drive transmission between the shaft section and the actuating device in the second direction of rotation of the motor. Thus, it is achieved that a shaft section which is present anyway and which is connected to the roller is also used for driving the actuating device and that a very simple and low-cost construction is obtained for the drive means intended for driving the actuating device, which construction has the advantage that it is very compact and has no effect to be allowed for or no undesired effect on the transport of the roller-driven record carrier through the apparatus in accordance with the invention.

In an apparatus in accordance with the invention it is possible to use a so-termed directional stop or a so-termed click-stop device or a freewheel device as a unidirectional coupling. However, in an apparatus in accordance with the invention it has proved to be very advantageous if the unidirectional coupling comprises a wrap spring mounted on the shaft section. This is very advantageous for a particularly simple, compact and cheap construction.

In an apparatus in accordance with the invention as defined in the preceding paragraph it has also proved to be very advantageous if the wrap spring has a spring end which projects towards the actuating device and is connected to the actuating device with at least minimal play. This has proved to be advantageous in view of a particularly accurate operation of an actuating device.

In all the afore-mentioned apparatuses in accordance with the invention it has proved to be particularly advantageous if a shaft section, an actuating device and a unidirectional coupling are arranged adjacent each of the two axial ends of the roller. This guarantees a reliable and smooth movement of a printing device without the printing device being subjected to any torsional load.

In an apparatus in accordance with the invention as defined in the preceding paragraph it has proved to be particularly advantageous if two identical wrap springs are interposed as unidirectional couplings between the two shaft sections and the two actuating devices. This is favorable for a particularly simple manufacture of the apparatus and a very cheap construction of the apparatus because identical rather than mutually different wrap springs are used.

In all the afore-mentioned apparatuses in accordance with the invention it has further proved to be very advantageous if the actuating device comprises an actuating disc having at least one actuating projection in its circumferential area. Thus, the advantages which can be obtained by means of this construction which is known per se, i.e. a particularly simple and reliable construction, are also obtained in apparatuses in accordance with the invention.

In an apparatus in accordance with the invention as defined in the preceding paragraph it has proved to be particularly advantageous if the actuating disc has at least one integral resilient arm which projects from the actuating disc in its circumferential area and which forms a part of an actuating projection. Thus, it is achieved that by means of an actuating disc, in addition to the actuating function performed via the resilient arm of this disc, further functions can be performed via this resilient arm.

In all the afore-mentioned apparatuses in accordance with the invention it has proved to be very advantageous if there has been provided at least one locating stop for the actuating device and the actuating device has at least one part which engages against the locating stop to define the position of the actuating device when the motor operates in the first direction of rotation. In this way it is achieved that each time that the motor is started in the first direction of rotation, i.e. the motor is driven in its first direction of rotation, an actuating device is moved to a position which is defined by a locating stop and which is accurately defined thereby, as a result of which an exact operation of an actuating device is assured. Moreover, it is thus achieved that during assembly of the apparatus an actuating device need not be brought into an exactly defined position, because the actuating device is brought into an accurately defined position by means of the locating stop when the apparatus is put into operation for the first time and the motor is thus started in its first direction of rotation for the first time.

In an apparatus in accordance with the invention as defined in the preceding paragraph, in which the actuating device is formed by an actuating disc having a projecting resilient arm, it has proved to be very advantageous if the part of the actuating device comprising an actuating disc and intended for engagement against the locating stop is formed by a part of a resilient arm forming an actuating projection. This is very advantageous for a compact and particularly simple construction as well as for a simple and reliable operation.

In all the afore-mentioned apparatuses in accordance with the invention it has proved to be advantageous if the roller and the at least one shaft section are rotatably supported in the apparatus and are otherwise mounted to be stationary, the printing device is mounted in the apparatus so as to be movable, and the printing device is movable away from the roller by means of the at least one actuating device. In practice, this has proved to be very favorable, particularly in the case that the roller also cooperates with other units of the apparatus, such as a scanning device for scanning a record carrier carrying recordings.

The afore-mentioned as well as further aspects of the invention will be apparent from the exemplary embodiment described hereinafter and will be elucidated by means of this exemplary embodiment.

BRIEF DESCRIPTION OF THE DRAWING

The invention will now be described in more detail with reference to the drawings, which shows an exemplary embodiment to which the invention is not limited.

DESCRIPTION OF THE PREFERRED EMBODIMENTS

Figure 1:
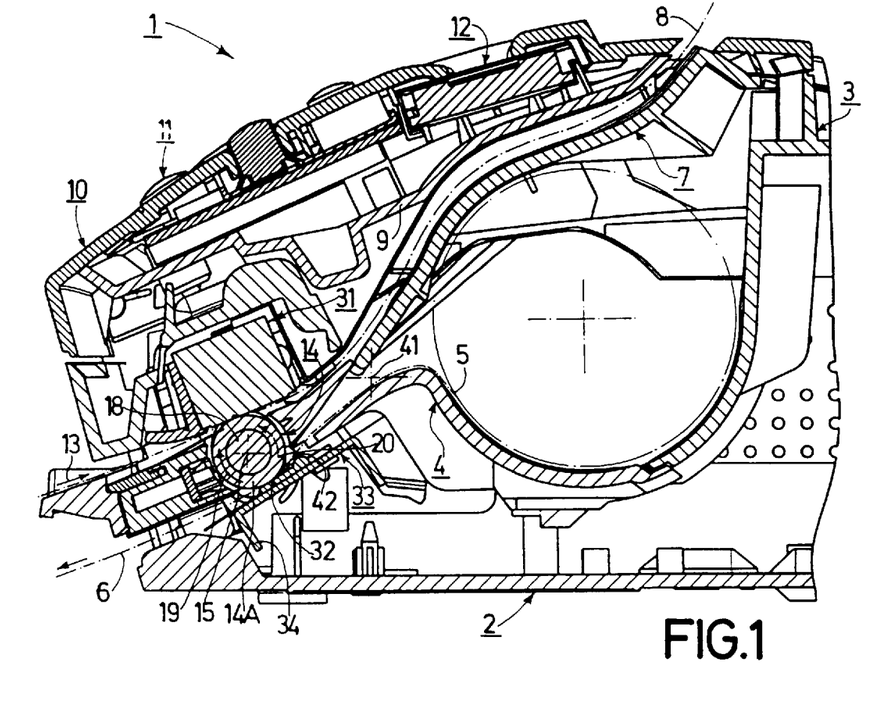
FIG. 1 is a cross-sectional view showing a relevant part of a first embodiment of the apparatus in accordance with the invention, which comprises a record-carrier drive roller which is rotationally drivable in opposite directions of rotation by a motor via a toothed-wheel mechanism, a printing device for printing on record carriers, and a scanning device for scanning record carriers.

FIG. 1 shows a part of an apparatus 1 in accordance with an exemplary embodiment of the invention, which takes the form of a so-termed facsimile apparatus. The apparatus 1 has a lower housing section 2 on which an upper housing section 3 is mounted. The upper housing section 3 has a receptacle 4 into which a roll of thermal paper 5, shown as a dash-dot line in FIG. 1, can be loaded. The thermal paper 5, which can be pulled off the roller, can be fed through the apparatus 1 along a first paper path 6 indicated by a dash-dot line in FIG. 1, the paper transport being effected by means of a roller, as will be described in more detail hereinafter. In the upper housing section 3 a further housing section 7 is mounted, which bounds the receptacle for the roll of thermal paper 5 at the upper side and which also bounds a second paper path 8, also indicated as a dash-dot line in FIG. 1. The second paper path 8 is bounded, not only by the further housing section 7, but also by a lower housing section 9 of an input device 10 in the form of a unit accommodated in the upper housing section 3. The input device 10 comprises, inter alia, an input keyboard 11 and a display device 12 on its upper side. It is to be noted that a sheet of paper already carrying recordings can be fed through the apparatus 1 along the second paper path 8 in the direction indicated by the arrow 13, which paper sheet can be driven by means of a roller, as will be described in more detail hereinafter.

In the apparatus 1 shown in FIG. 1 the thermal paper 5 forms a record carrier to be printed on, and a paper sheet, which is not shown in FIG. 1 and which can be fed along the second paper path 8, forms a record carrier to be scanned.

Figure 4:
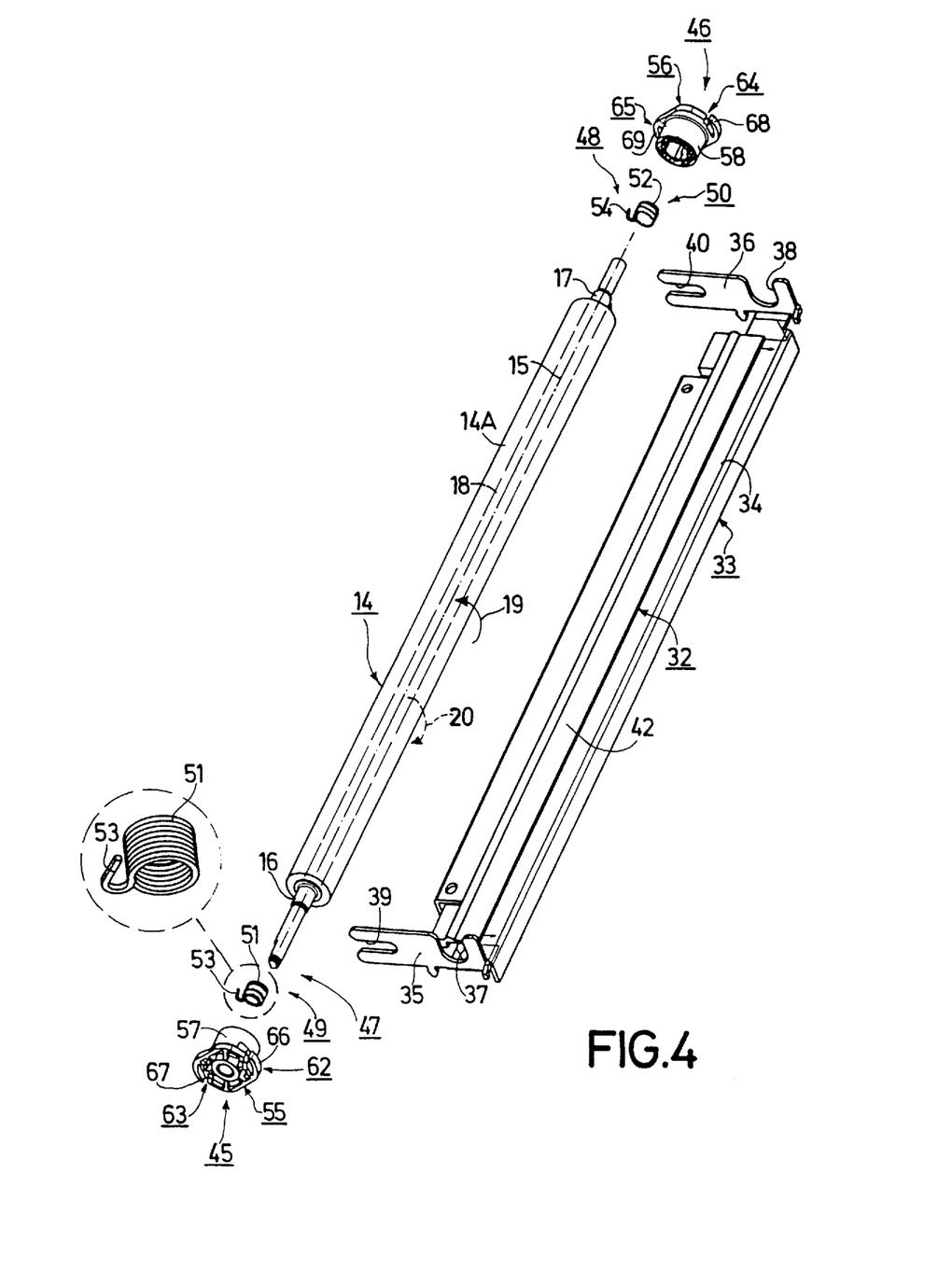
FIG. 4 is an exploded plan view showing the rotationally drivable roller and the printing device as well as two actuating devices for moving the printing device away from the roller of the apparatus of FIG. 1, which actuating devices are each rotatably mounted on a shaft section connected to the roller.

To drive the two record carriers, i.e. to feed both the thermal paper 5 along the first paper path 6 and to feed a paper sheet along the second paper path 8, the apparatus 1 comprises a roller 14 which is rotationally drivable in opposite directions of rotation and which has a hollow cylindrical sleeve 14A of rubber or an elastomeric material. The roller 14 is rotatable in the apparatus about a roller axis 15. As can be seen in FIG. 4, the roller 14 is connected to two shaft sections 16 and 17. The two shaft sections 16 and 17 are formed by the free axial ends of a shaft 18 which extends through the hollow cylindrical sleeve 14A of the roller 14. To drive the thermal paper 5 which is movable along the first paper path 6 and to drive a sheet which is movable along the second paper path 8, the roller 14 can be driven in a first direction of rotation, indicated by a solid-line arrow 19 in the Figures. For other purposes, to be described hereinafter, the roller 14 can be driven in a second direction of rotation, indicated by a broken-line arrow 20 in the Figures.

Figure 2:
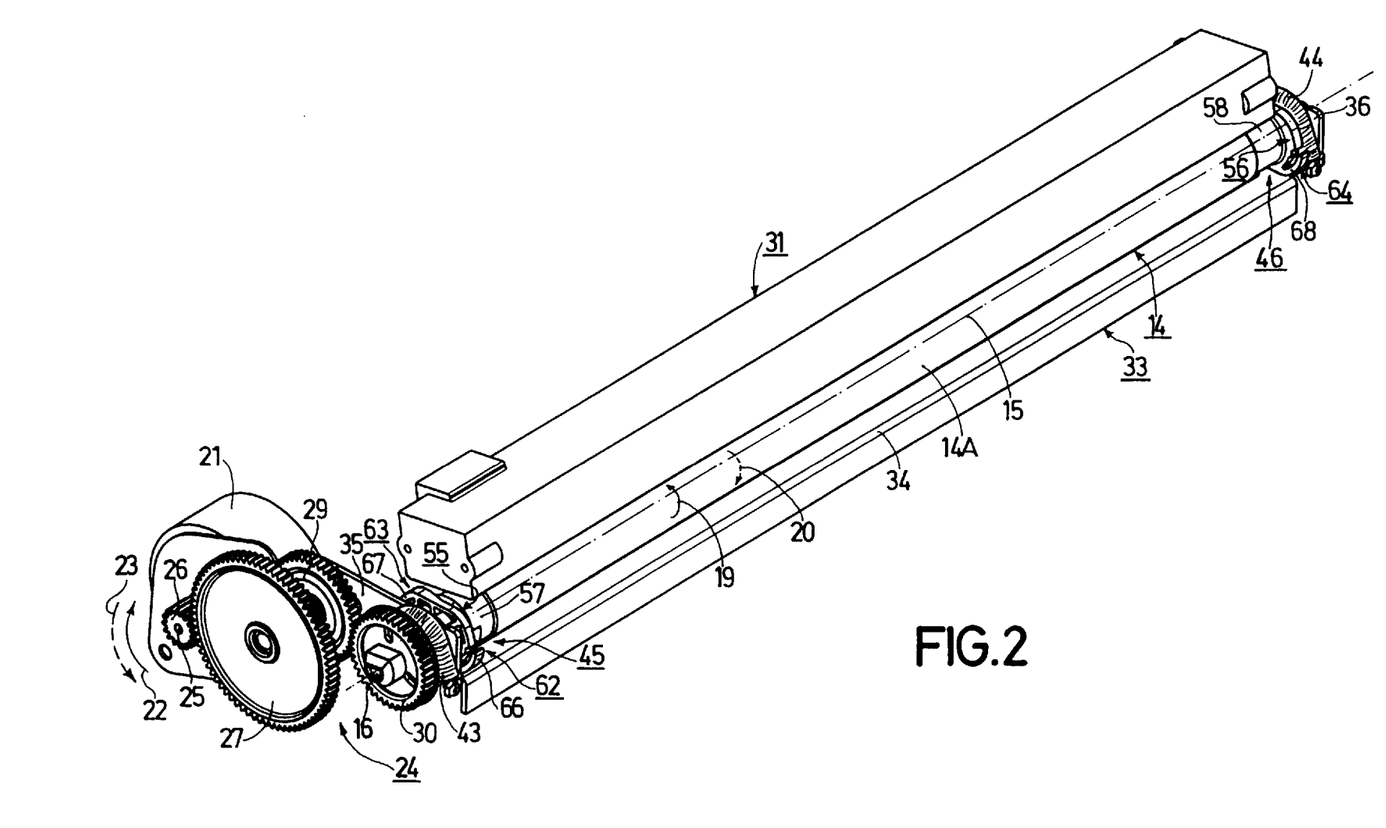
FIG. 2 is an oblique view from the top showing the rotationally drivable roller, the motor, the roller-drive toothed-wheel mechanism, the printing device and the scanning device of the apparatus of FIG. 1.
Figure 3:
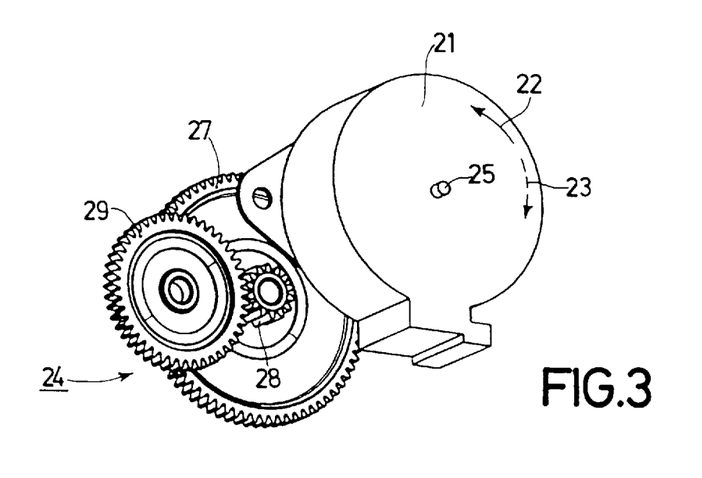
FIG. 3 is another oblique view showing the motor and a part of the toothed-wheel mechanism for driving the roller of the apparatus shown in FIG. 1.

The apparatus I comprises a motor 21, shown in FIGS. 2 and 3, for driving the roller 14. The motor 21 is formed by a stepper motor. The motor 21 can be operated in a first direction of rotation and in an opposite second direction of rotation. The first direction of rotation of the motor 21 is indicated by a solid-line arrow 22 in FIGS. 2 and 3. The second direction of rotation of the motor 21 is indicated by a broken-line arrow 23 in FIGS. 2 and 3. The first direction of rotation 22 of the motor 21 corresponds to the first direction of rotation 19 of the roller 14. The second direction of rotation 23 of the motor 21 corresponds to the second direction of rotation 20 of the roller 14. Consequently, when the motor 21 rotates in its first direction of rotation 22 the roller 14 is driven in its first direction of rotation 19 and when the motor 21 rotates in its second direction of rotation 23 the roller 14 is driven in its second direction of rotation 20. To control the motor 21 with respect to the steps to be made by it and with respect to its two direction of rotation 22 and 23, the apparatus 1 comprises a motor control device implemented by means of a microprocessor. This motor control device is not shown and described in more detail herein because such a motor control device belongs to the general state of the art and the implementation of such a motor control device is obvious to an average expert.

To drive the roller 14 by means of the motor 21 the apparatus 1 shown in FIG. 1 comprises a toothed-wheel mechanism 24, as is shown in FIGS. 2 and 3. The toothed-wheel mechanism 24 comprises a first pinion 26, which is rotationally locked to the motor shaft 25 and which is in mesh with a first toothed wheel 27. The first toothed wheel 27 is integral and coaxial with a second pinion 28, as can be seen in FIG. 3. The second pinion 28 is in mesh with a second toothed wheel 29. The second toothed wheel 29 is in mesh with a third toothed wheel 30, which is rotationally locked to the shaft section 16 of the shaft 18 of the roller 14. The motor 21 can drive the roller 14 by means of this toothed-wheel mechanism 24.

In order to feed or drive a sheet already carrying scannable recordings along the second paper path 8 through the apparatus 1 as indicated by means of the arrow 13, the roller 14 is driven by the motor 21 so as to rotate in its first direction of rotation 19. In order to scan the scannable recordings already present on such a sheet of paper, the apparatus 1 comprises a scanning device 31 shown in FIGS. 1 and 2. Such a scanning device 31 is generally referred to as a scanner. By means of the scanning device 31 the recordings already made on a sheet of paper, for example text or a graph, can be scanned while the sheet is driven in steps by means of the motor 21 and the roller 14, the scanning device 31 generating digital data which correspond to the recorded data on a sheet of paper and which can, for example, be transmitted to another facsimile apparatus. In the present apparatus 1 as shown in FIGS. 1 and 2 a scanning surface of the scanning device 31 is constantly held in contact with the circumferential surface of the roller 14, as a result of which, after a sheet of paper has been fed into the contact area between the contact surface of the scanning device 31 and the circumferential surface of the roller 14, the sheet of paper is driven and fed through the apparatus 1 along the second paper path 8, as indicated by the arrow 13, under the influence of the frictional effect applied via the circumferential surface of the roller 14.

In order to print on the thermal paper 5 the 1 comprises a printing device 32 show in FIGS. 1 and 4. In the present case the printing device 32 is formed by a thermal printing device, which extends substantially parallel to the roller 14 and takes the form of a printing strip. Along its longitudinal direction the printing strip comprises a multitude of thermal printing elements, which is known per se and is therefore not described any further.

The printing device 32 is arranged on a pivotably mounted supporting member 33. The supporting member 33 comprises a substantially U-shaped member 34, which at both longitudinal ends has integral limbs 35 and 36, which extend at substantially right angles to the member 34. The member 34 and the two limbs 35 are made of a sheet metal. Each of the two limbs 35 and 36 have a guide slot 37 and 38, respectively. Each of the two guide slots 37 and 38 is engaged by a plastic sleeve slid onto a respective ont of the two shaft sections 16 and 17, so that during pivoting of the supporting member 33 the supporting member 33 is guided by means of the plastic sleeves on the shaft sections 16 and 17 via its guide slots 37 and 38. Each of the two limbs 35 and 36 has a further slot 39 and 40, respectively. By means of these two further slots 39 and 40 the two limbs 35 and 36 of the supporting member 33 are slid onto trunnions, not shown, of the apparatus. By means of the trunnions, not shown, and the further slots 39 and 40 the supporting member 33 is mounted so as to be pivotable about a pivotal axis 41. The pivotal axis 41 is indicated by a dash-dot cross in each of the FIGS. 1, 5, 6, 7, 8 and 9.

A contact surface 42 of the printing device 32, which device extends parallel to the roller 14 and is movably supported by means of the pivotable supporting member 33, is held in engagement with the circumferential surface of the roller 14 in an operating mode, i.e. in a printing mode of the apparatus 1, in which the thermal paper is to be printed, for example when a facsimile message is received or when a copy is made of a sheet of paper which is fed through the apparatus 1 along the second paper path 8, the thermal paper 5 normally being situated between the roller 14 and the printing device 32. In another operating mode of the apparatus 1, i.e. in a scanning mode of the apparatus 1, in which the thermal paper should not be printed by means of the printing device 32 but in which a sheet of paper fed through the apparatus 1 along the second paper path 8 should only be scanned by means of the scanning device 31, the contact surface 42 of the printing device 32 is spaced at a given distance from the circumferential surface of the roller 14.

In order to bring and keep the contact surface 42 of the printing device 32 at the given distance from the circumferential surface of the roller 14, the printing device 32 and the roller 14 in the apparatus 1 are movable relative to one another in a direction transverse to the roller axis 15. In the present apparatus 1 the contact surface 42 of the printing device 32 can be moved away from the circumferential surface of the roller 14, for which purpose the printing device 32 is mounted on the pivotable supporting member 33. The printing device 32 is moved away from the roller 14 in opposition to the force exerted by two helical tension springs 43 and 44 shown in FIG. 2, both having their ends attached to the supporting member 33 and whose central portions lie around the afore-mentioned plastic sleeves, not shown, slid onto the shaft sections 16 and 17. In this way, the roller 14 and the supporting member 33, i.e. the printing device 32, are spring-loaded relative to one another in such a manner that, as already stated, the contact surface 42 of the printing device 32 is held against the circumferential surface of the roller 14 in a printing mode of the apparatus 1.

In order to move the printing device 32 away from the roller 14 the apparatus 1 comprises two actuating devices 45 and 46, which are shown in FIGS. 2 and 4 and of which one actuating device 45 is also shown in FIGS. 5 to 10. The actuating device 45 is rotatably mounted on the shaft section 16 connected to the roller 14. The other actuating device 46 is rotatably mounted on the shaft section 17 connected to the roller 14.

To drive the two actuating devices 45 and 46 the apparatus 1 comprises drive means 47 and 48, which are shown particularly in FIG. 4. The drive means 47 and 48 can also be driven by the motor 21, which can be switched between its two directions of rotation 22 and 23, when the motor 21 runs in the second direction of rotation 23. In the second direction of rotation 23 of the motor 21 the two actuating devices 45 and 46 can be driven by the drive means 47 and 48 to move the printing device 32 and the roller 14 relative to one another, i.e. to move the printing device 32 away from the roller 14.

In the apparatus 1 there has been provided advantageously that each of the two shaft sections 16 and 17 connected to the roller 14 forms part of the drive means 47 and 48 and that the drive means 47 and 48 further comprise a unidirectional coupling 49 or 50 arranged adjacent the respective actuating device 45 or 46 and drivable via the respective shaft section 16 or 17, which coupling in the second direction of rotation 23 of the motor 21 forms a drive transmission between the respective shaft section 16 or 17 and the respective actuating device 45 or 46. Each of the two unidirectional couplings 49 and 50 comprises a wrap spring 51 and 52, respectively. Each wrap spring 51 or 52 has a spring end 53 or 54, respectively, which projects toward the relevant actuating device 45 or 46, and each spring end 53 or 54 is connected to the relevant actuating device 45 or 46 with at least minimal play, but suitably this connection is play free. In the present case the two wrap springs 51 and 52 are identical in an advantageous manner.

Figure 9:
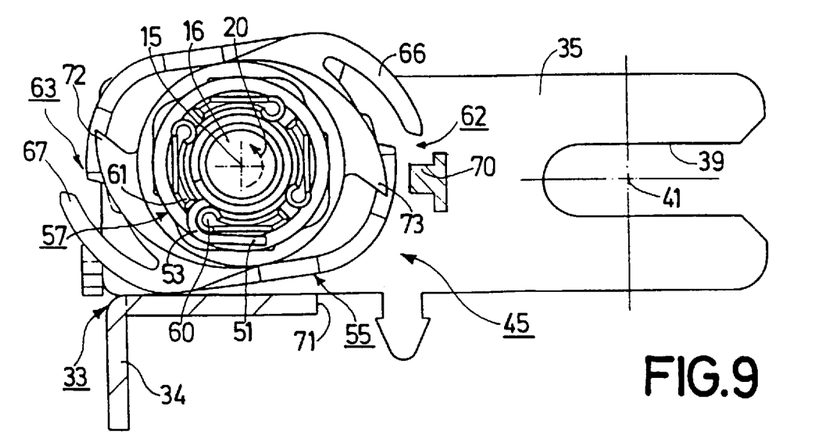
FIG. 9, in the same way as FIGS. 5, 6, 7 and 8, shows the actuating device and the supporting member of the apparatus of FIG. 1, the actuating device being shown in a third intermediate position.
Figure 10:
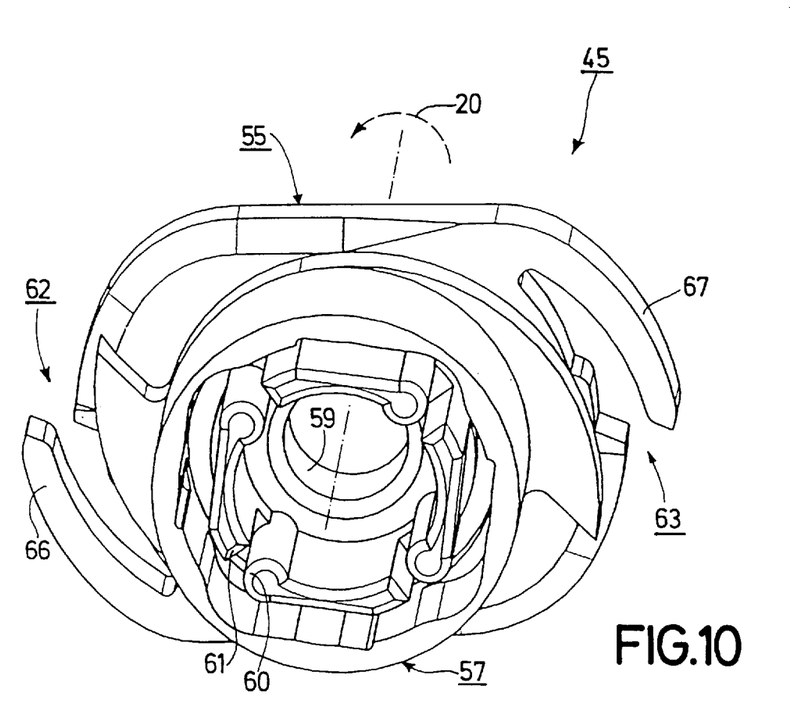
FIG. 10 is an oblique view showing an actuating device of the apparatus of FIG. 1.

As is apparent from FIGS. 2 and 4 for both actuating devices 45 and 46 and as is clearly shown in FIG. 10 for the one actuating device 45, the two actuating device 45 and 46 each comprise an actuating device, 55 and 56 respectively, and a hollow cylinder, 57 and 58 respectively, which is integrally connected to the respective actuating disc 55 or 56. Each actuating disc 55 or 56 has a bore by which the respective actuating disc 55 or 56 is slid onto the associated shaft section 16 or 17 and is thus rotatable. In the actuating device 45 shown in FIG. 10 said bore bears the reference numeral 59. In the assembled condition the respective hollow cylinders 57 and 58 of each of the two actuating devices 45 and 46 cover the relevant wrap spring 51 or 52. As is shown for the actuating device 45 of FIGS. 5 to 10, each of the two hollow cylinders 57 and 58 has inside it a rounded stop 60 and, disposed opposite this rounded stop 60, a counter-stop 61. The spring end 53 of the wrap spring 51 fits without play between the rounded stop 60 and the counter-stop 61. The same applies to the spring end 54 of the warp spring 52, which cooperates with the other actuating device 46.

In its circumferential area each of the two actuating discs 55 and 56 has two actuating projections 62, 63 and 64, 65, respectively. Furthermore, it is to be noted that each of the two actuating discs 55 and 56 has two integrated resilient arms 66, 67 and 68, 69, respectively, which project from the respective actuating disc 55 or 56 in its circumferential area and which each form part of a respective actuating projection 62, 63, 64 or 65.

Figure 5:
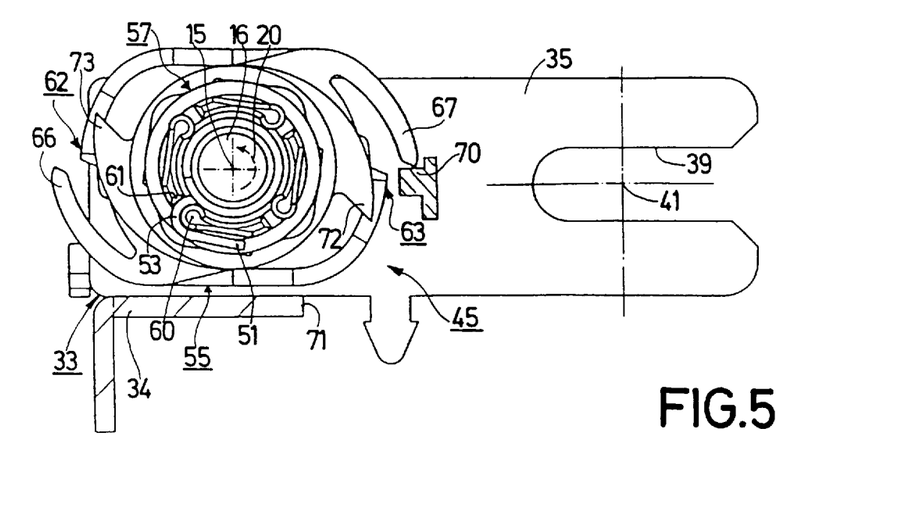
FIG. 5 is a partly sectional side view of an actuating device which is rotatably mounted on a shaft section and a supporting member carrying the printing device of the apparatus of FIG. 1, the actuating device being shown in a first locating position.

As is shown for the actuating device 45 of FIGS. 5 and 9 the apparatus 1 comprises a locating stop 70 and a further locating stop 71 for each of the two actuating devices 45 and 46 and each of the actuating devices 45 and 46 comprises a portion which in the first direction of rotation 22 of the motor 21 engages with the locating stop 70 to position the respective actuating device 45 or 46 in a first locating position and with the further locating stop 71 to position the respective actuating device 45 or 46 in a second locating position. In the apparatus 1 the part of the actuating device 45 and 46 comprising an actuating disc 55 or 56, respectively, provided to engage with the two locating stops 70 is advantageously formed by a resilient arm 66, 67, 68 or 69, respectively, which projects from the respective actuating disc 55 or 56 and forms part of an actuating projection 62, 63, 64 or 65, respectively. The further locating stop is advantageously formed by a portion of the supporting member 33.

Hereinafter, the operation of the apparatus 1 as regards the movement of the printing device 32 away from the roller 14 and towards the roller 14 will be explained briefly with reference to, in particular, FIGS. 5 to 9.

It is assumed that the apparatus 1 shown in FIG. 1 is in an operating mode in which the contact surface 42 of the printing device 32 is held in engagement with the circumferential surface of the roller 14 and in which the supporting member 33, which carries the printing device 32, and the actuating devices 45 and 46 occupy a relative position with respect to one another as shown in FIG. 5 for the actuating device 45 and in which the actuating device 45 is in a first locating position.

As already stated hereinbefore, the printing device 32 is always lifted off the roller 14 in a scanning mode in which no printing on the thermal paper 5 should be effected by means of the printing device 32 but in which only a sheet of paper fed through the apparatus 1 along the second paper path 8 should be scanned. As soon as such a sheet is inserted into the apparatus I along the second paper path 8 in the direction indicated by the arrow 13, a photoelectric beginning-of-paper sensor arranged at the location of the first paper path 8 detects the insertion of the sheet of paper and, subsequently, the motor 21 is driven in its first direction of rotation 22 by means of the motor control device for a given short time interval T1. Driving of the motor 21 in its first direction of rotation 22 proceeds until the sheet of paper inserted into the apparatus 1 is fed into the apparatus 1 over a given distance A by the roller 14 driven in the first direction of rotation 19 by the motor 21 via the toothed-wheel mechanism 24.

After this, the motor 21 is driven in its second direction of rotation 23 for a time interval T2 shorter than the time interval T1 in which the motor 21 is driven in its first direction of rotation 22. As a result of this, the shaft sections 16 and 17, i.e. the shaft 18 of the roller 14 and, consequently, the roller 14, are driven in the second direction of rotation 20. As a consequence, the sheet of paper which has previously been drawn into the apparatus 1 over a distance A by means of the roller 14 is now fed out of the apparatus 1 over a distance B smaller than the distance A, to give the user of the apparatus 1 an indication that the apparatus 1 has been put into operation correctly, but this does not serve any other functional purpose.

Figure 6:
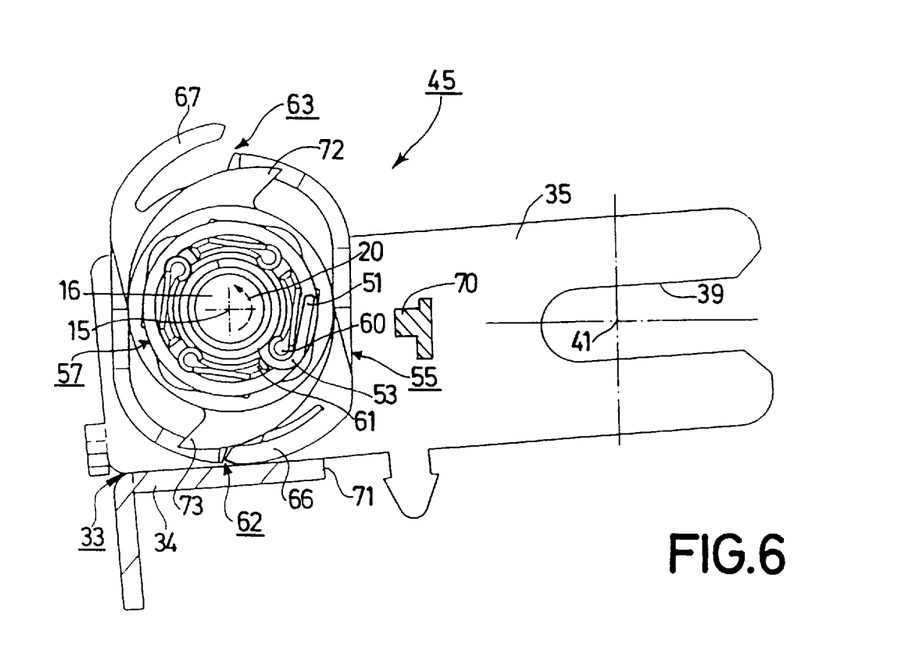
FIG. 6, in the same way as FIG. 5, shows the actuating device and the supporting member of the apparatus of FIG. 1, the actuating device being shown in a first intermediate position.
Figure 7:
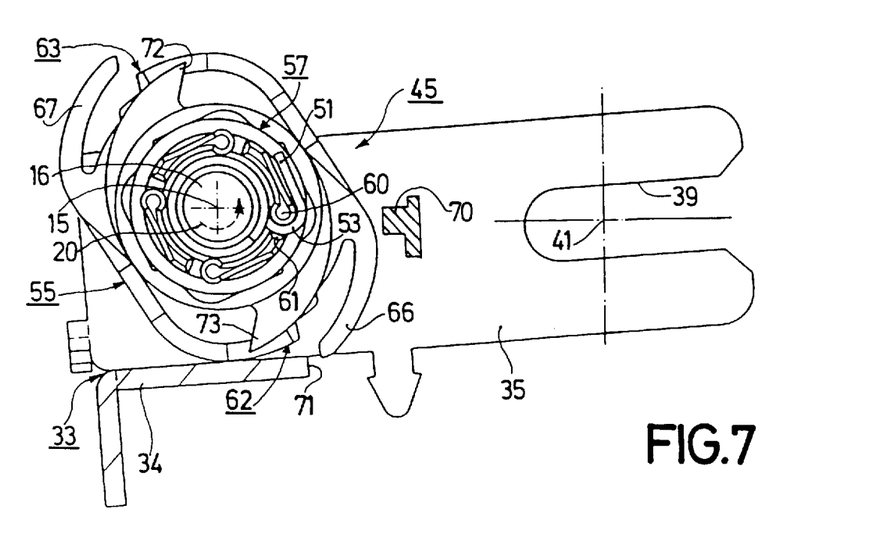
FIG. 7, in the same way as FIGS. 5 and 6, shows the actuating device and the supporting member of the apparatus of FIG. 1, the actuating device being shown in a second intermediate position.

When the shaft sections 16 and 17 are driven in the second direction of rotation 20 for the time interval T2 the turns of the wrap springs 51 and 52 are tightened around the shaft sections 16 and 17, so that by means of the warp springs 51 and 52 the shaft sections 16 and 17 also drive the actuating devices 45 and 46, which are rotatably mounted on the shaft sections 16 and 17, in the second direction of rotation 20. As can be seen in FIGS. 5 and 6 for the actuating device 45, this causes the resilient arms 66 and 68 of the actuating projections 62 and 64 of the actuating discs 55 and 56 to engage operatively with the supporting member 33, as a result of which the supporting member 33 and the printing device 32 arranged are moved away from the roller 14 in opposition to the force exerted by the tension springs 43 and 44. The resilient arms 66 and 68 are then urged towards the actuating discs 55 and 56, for which corresponding recesses have been provided in the actuating discs 55 and 56. FIG. 6 shows the actuating device 45 in a first intermediate position occupied before the end of the time interval T2. From the first intermediate position shown in FIG. 6 the one actuating device 45 and, consequently, also the other actuating device 46 are rotated further in the second direction of rotation 20 until the two actuating devices 45 and 46 each occupy a second intermediate position, which is shown in FIG. 7 for the actuating 45. Briefly before this second intermediate position is reached an electrical switch of the motor control device, which switch can be controlled by means of a switching nose 72 arranged in the tow actuating devices, produces a switching command, as a result of which the motor 21 performs only a few steps after the occurrence of the switching command and is subsequently switched off after the time interval T2. In the second intermediate position of the two actuating devices 45 and 46, as shown in FIG. 7, the supporting member 33 and, consequently, the printing device 32 mounted on it are held at a given distance from the roller 14 by means of the actuating projections 62 and 64.

Figure 8:
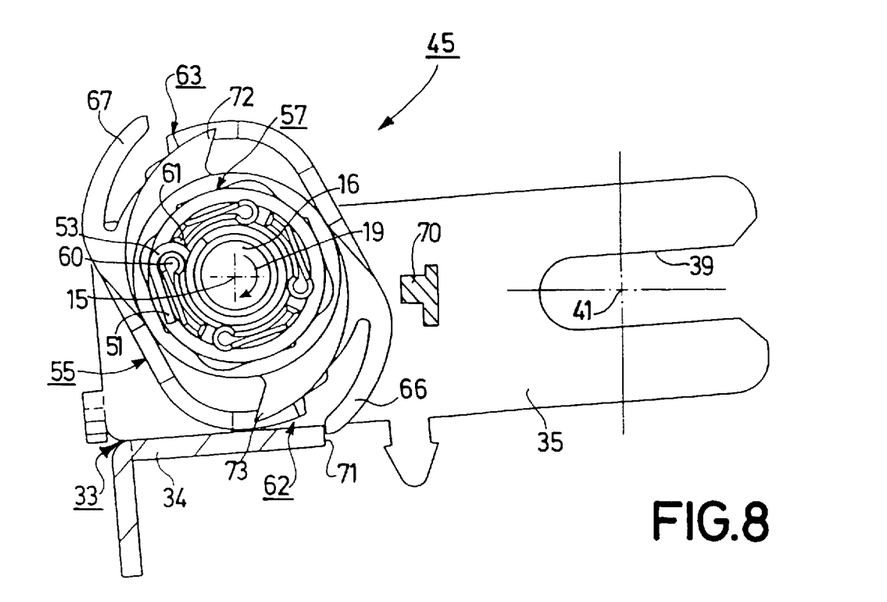
FIG. 8, in the same way as FIGS. 5, 6 and 7, shows the actuating device and the supporting member of the apparatus of FIG. 1, the actuating device being shown in a second locating position.

After the two actuating devices 45 and 46 have reached their second intermediate position as shown in FIG. 7, the motor control device starts the motor 21 of the apparatus 1 in the first direction of rotation 22 in order to drive the sheet fed into the apparatus 1 via the second paper path 8 stepwise by means of the roller 14 which is driven in its first direction of rotation 19 via the toothed-wheel mechanism 24, in order to scan the information recorded on the sheet in a line by line fashion by means of the scanning device 31. The two shaft sections 16 and 17 are then also driven in the first direction of rotation 19, as a result of which, when this driving begins, the two actuating devices 45 and 46—as shown in FIG. 8 for the actuating device 45—are moved in the second direction of rotation 20 via the wrap springs 51 and 52 which are moved along by the shaft sections 16 and 17 owing to the still existing low friction in the direction of expansion of the wrap springs 51 and 52, the movement of the actuating devices being continued until the resilient arms 66 and 68 engage against the further locating stops 71 on the supporting member 33. In this way it is achieved that, in the case that the two actuating devices 45 and 46 are not both exactly in the second intermediate position shown in FIG. 7, the two actuating devices 45 and 46 assume exactly the same angular positions, i.e. the second locating position shown in FIG. 8 for the actuating device 45, in that the two actuating devices 45 and 46 are rotated in the second direction of rotation 20 and the resilient arms 66 and 68 engage against the further locating stops 71. This is advantageous for a correct and distortion-free actuation of the supporting member 33 and, consequently, of the printing device 32. The motor 21 is driven in its first direction of rotation 22 until the sheet of paper to be scanned by means of the scanning device 31 has been scanned completely, which is detected by means of an end of sheet sensor. Such an end of sheet sensor then supplies control information to the motor control device.

After having received such control information from the end of sheet sensor the motor control device causes the motor 21 to be started in its second direction of rotation 23 for a given time interval T3. As a result of this, the two actuating devices 45 and 46 are rotated in the second direction of rotation 20 via the toothed-wheel mechanism 24, the shaft sections 16 and 17, and the wrap springs 51 and 52. Consequently, the two actuating devices 45 and 46 are pivoted in the second direction of rotation 20 out of the second locating position as shown in FIG. 8 for the actuating device 45. The actuating projections 62 and 64 are then pivoted in such a manner that the supporting member 33 and, consequently, the printing device 32 are drawn towards the roller 14 under the influence of the force exerted by the tension springs 43 and 44. Moreover, the resilient arms 66 and 68 of the actuating projections 62 and 64 then engage with the locating stops 70, as a result of which the resilient arms 66 and 68 are urged towards the actuating discs 55 and 56, but this is not shown separately in the Figures. The two actuating devices 45 and 46 are rotated so far that the resilient arms 66 and 68 are disengaged from the locating stops 70. It is not until after this that the motor 21 is switched off again by the motor control device after expiry of the given time interval T3, upon which the two actuating devices 45 and 46 occupy a third intermediate position as shown in FIG. 9 for the actuating device 45. In this third intermediate position the two actuating discs 55 and 56 are no longer in contact with the supporting member 33, as a result of which the contact surface 42 of the printing device 32 is applied to the circumferential surface of the roller 14 by the force of the tension springs 43 and 44, while the thermal paper 5 is interposed.

After the two actuating devices 45 and 46 have assumed their third intermediate position in accordance with FIG. 9, the two shaft sections 16 and 17 are driven in the first direction of rotation 19 when the motor 21 is subsequently started in its first direction of rotation 22, as a result of which, when this driving begins, the two actuating devices 45 and 46 are driven in the first direction of rotation 19 via the wrap springs 51 and 52 which are moved along by the shaft sections 16 and 17 owing to the still existing low friction in the direction of expansion of the wrap springs 51 and 52. As a result, the resilient arms 66 and 68 engage against the locating stops 70, as shown in FIG. 5, so that the two actuating devices 45 and 46 again occupy the first locating position as shown in FIG. 5 for the actuating device 45. The above described positioning process for the two actuating devices 45 and 46 by means of the locating stops is particularly advantageous because this ensures that the two actuating devices 45 and 46 assume exactly the same angular position corresponding to the first locating position.

This is advantageous for a uniform and distortion-free actuation of the supporting member 33 and, hence, of the printing device 32.

As is apparent from the above description and as can be seen In FIGS. 5 to 9, the two actuating devices 45 and 46 perform an angular movement through 180° during one operating cycle. In a subsequent operating cycle the two actuating devices 45 and 46 also perform an angular movement through 180°, the actuating devices 45 and 46 ensuring that the resilient arms 67 and 69 of the actuating projections 63 and 65 of the actuating discs 55 and 56 and a further switching nose 73 are activated in an entirely similar way.

The provision of diagonally opposed actuating projections 62, 63 and 64, 65 on each respective actuating disc 55 or 56 of the two actuating devices 45 and 46 has the advantage that shorter actuation times are achieved than in the case that each of the two actuating discs comprises only one actuating projection.

As is apparent from the above description, it is achieved by means of the apparatus 1 as shown in FIG. 1 that the two shaft sections 16 and 17, which are connected to the roller 14 and which are present anyway, are also used for driving the two actuating devices 45 and 46, and that the drive means for driving the two actuating devices 45 and 46, which means essentially comprise only the two simple unidirectional couplings 49 and 50, altogether form a very simple and low-cost construction, which since these drive means are disposed at the location of the two free axial ends of the roller 14, i.e. on the two shaft sections 16 and 17, have the advantage that only a very small space is required and no undesired influence is exerted on the movement of a record carrier driven by the roller 14 through the apparatus 1 in accordance with the invention.

The invention is not limited to the exemplary embodiment described hereinbefore. The measures in accordance with the invention can be applied not only to an apparatus in accordance with the invention constructed as a facsimile apparatus but, for example, also to a thermal printer adapted to print on thermal paper. Moreover, it is to be noted that the measures in accordance with the invention can also be used advantageously in an apparatus in accordance with the invention in which the printing device is stationary and the roller is mounted so as to be movable transversely to its roller axis and in which the movable roller can be moved away from the stationary printing device by means of at least one actuating device. Moreover, the roller is an apparatus in accordance with the invention can be drivable by a motor which directly drives shaft section connected to the roller, i.e. without any intermediate drive mechanism.

We claim:

1. An apparatus comprising
    a roller for driving a record carrier, which roller is rotatable about a roller axis and is connected to at least one shaft section, and
    a motor which can be operated in a first direction of rotation and in a second direction of rotation, which is opposite thereto, and which when operated in the first direction of rotation can drive the roller for driving a record carrier, and
    a printing device which extends substantially parallel to the roller and which has a contact surface held in engagement with the circumferential surface of the roller in one operating mode of the apparatus and spaced from the circumferential surface of the roller by a given distance in another operating mode of the apparatus, and
    at least one actuating device which is rotatably mounted on the shaft section connected to the roller and by means of which the printing device and the roller are movable relative to one another in a direction transversely to the roller axis, and
    drive means for driving the actuating device, which drive means can be driven by the motor and by means of which the printing device and the actuating device is drivable when the motor operates in the second direction of rotation, in order to move the printing device and the roller relative to one another,
    characterized in that the at least one shaft section connected to the roller forms a part of the drive means, and the drive means further comprise a unidirectional coupling arranged adjacent the actuating device and drivable via the shaft section, which coupling forms a drive transmission between the shaft section and the actuating device in the second direction of rotation of the motor.

2. An apparatus as claimed in claim 1, characterized in that the unidirectional coupling comprises a wrap spring mounted on the shaft section.

3. An apparatus as claimed in claim 2, characterized in that the wrap spring has a spring end which projects towards the actuating device and is connected to the actuating device with at least minimal play.

4. An apparatus as claimed in claim 1, characterized in that a shaft section, an actuating device and a unidirectional coupling are arranged adjacent each of the two axial ends of the roller.

5. An apparatus as claimed in claim 4, characterized in that two identical wrap springs are interposed as unidirectional couplings between the two shaft sections and the two actuating devices.

6. An apparatus as claimed in claim 1, characterized in that the actuating device comprises an actuating disc having at least one actuating projection in its circumferential area.

7. An apparatus as claimed in claim 6, characterized in that the actuating disc has at least one integral resilient arm which projects from the actuating disc in its circumferential area and which forms a part of an actuating projection.

8. An apparatus as claimed in claim 1, characterized in that there has been provided at least one locating stop for the actuating device and the actuating device has at least one part which engages against the locating stop to define the position of the actuating device when the motor operates in the first direction of rotation.

9. An apparatus as claimed in claim 8, characterized in that the part of the actuating device comprising an actuating disc and intended for engagement against the locating stop is formed by a part of a resilient arm forming an actuating projection.

10. An apparatus as claimed in claim 1, characterized in that the roller and the at least one shaft section are rotatably supported in the apparatus and are otherwise mounted to be stationary, the printing device is mounted in the apparatus so as to be movable, and the printing device is movable away from the roller by means of the at least one actuating device.

* * * * *